Feb. 18, 1930. H. N. BERRY 1,747,566
COTTON PICKER
Original Filed May 28, 1924 8 Sheets-Sheet 6

INVENTOR
H. N. Berry
BY
ATTORNEYS

Feb. 18, 1930.  H. N. BERRY  1,747,566
COTTON PICKER
Original Filed May 28, 1924   8 Sheets-Sheet 7
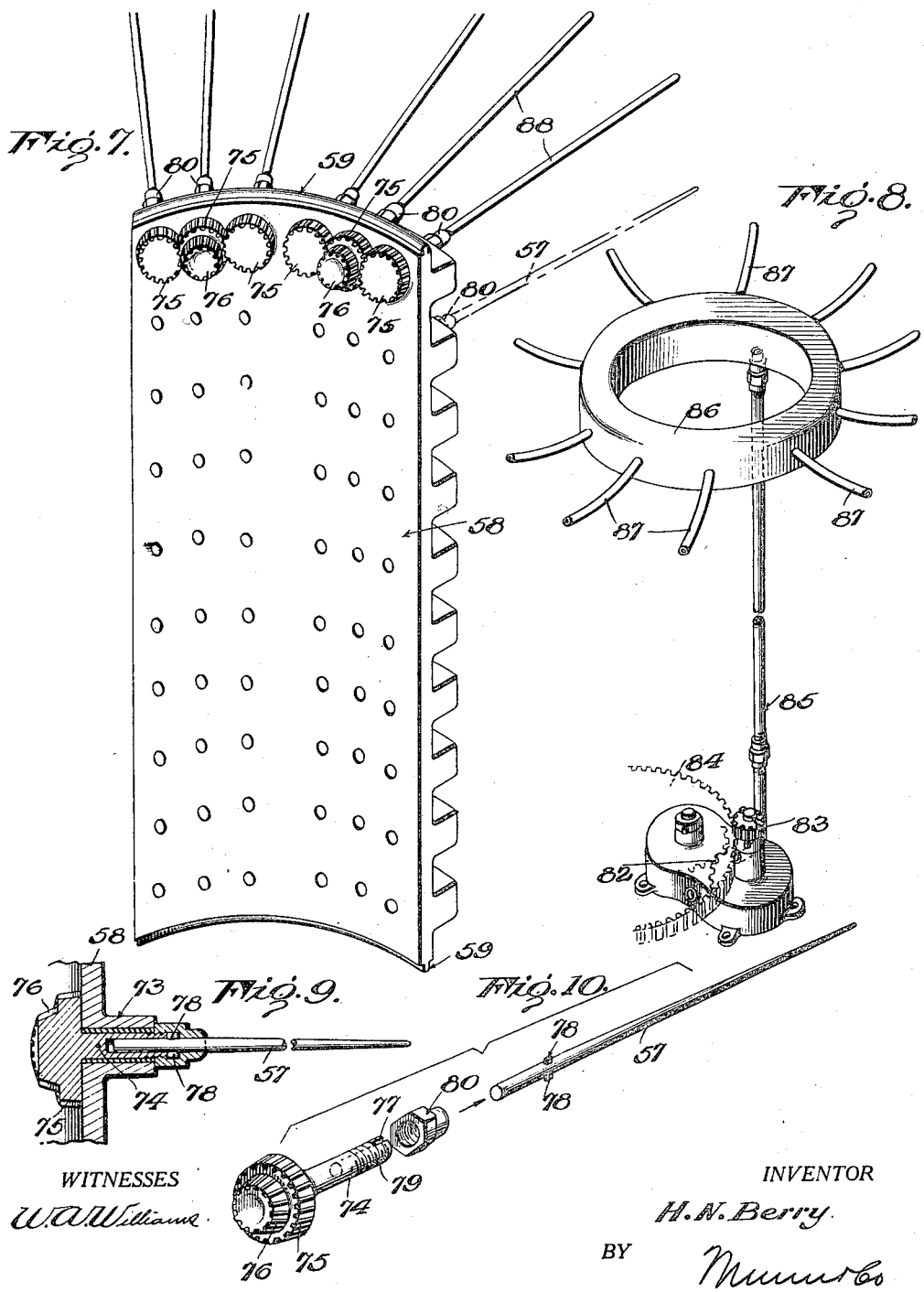
WITNESSES
INVENTOR
H. N. Berry
BY
ATTORNEYS

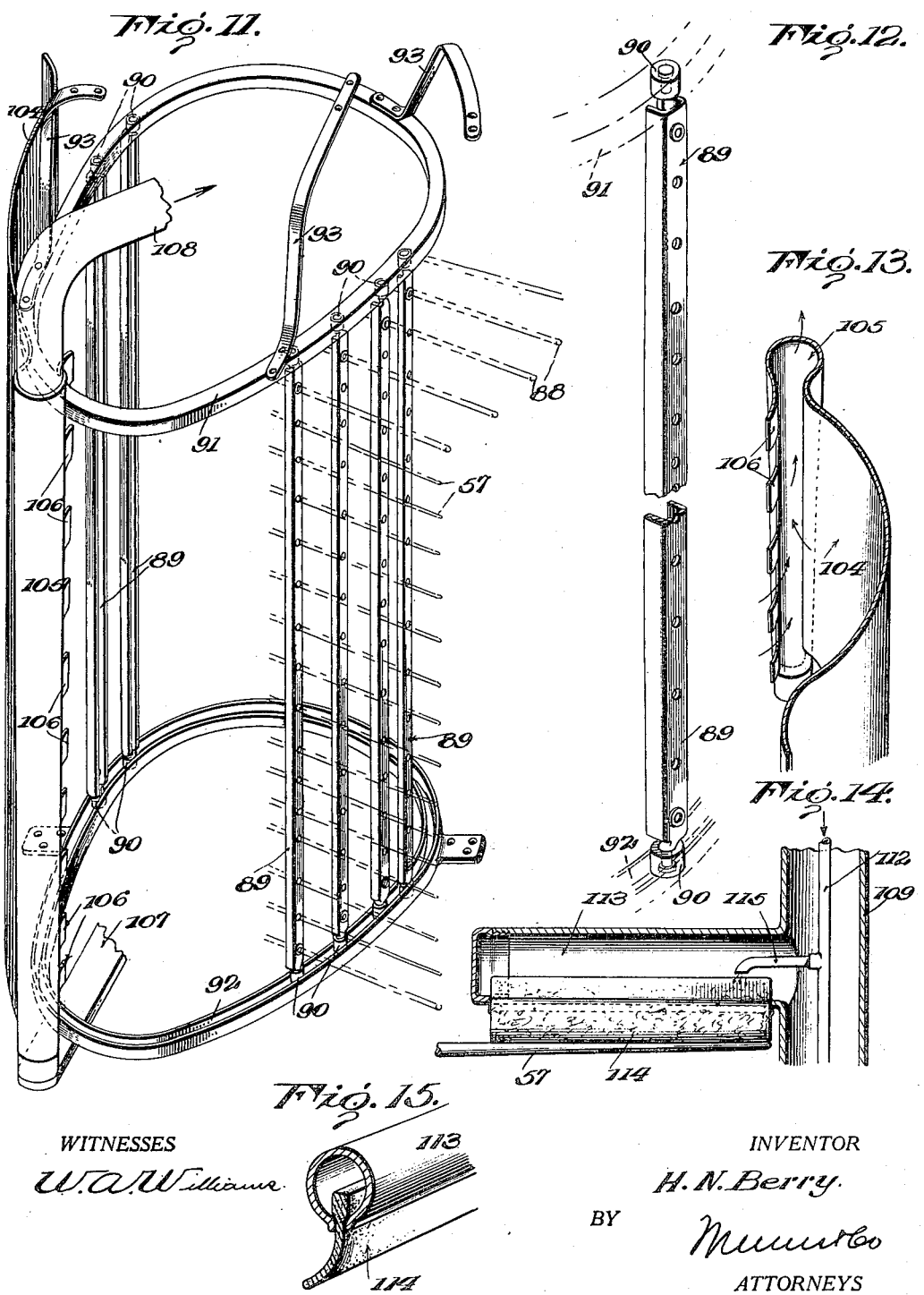

Patented Feb. 18, 1930

1,747,566

UNITED STATES PATENT OFFICE

HIRAM NEWTON BERRY, OF GREENVILLE, MISSISSIPPI, ASSIGNOR, BY DIRECT AND MESNE ASSIGNMENTS, TO COTTON HARVESTER CORPORATION OF AMERICA, OF GREENVILLE, MISSISSIPPI, A CORPORATION OF DELAWARE

COTTON PICKER

Continuation of application Serial No. 716,456, filed May 28, 1924. This application filed August 3, 1925. Serial No. 47,917.

The present invention relates generally to cotton pickers, and the present application is more particularly a continuation of my application Serial Number 716,456, filed May 28, 1924, the invention consisting of a cotton picker, wherein the principal or active elements are in the nature of laterally spaced cylinders mounted on a frame and revolved on vertical axes by movement of said frame, each cylinder having a series of radially outstanding picking fingers revolving as a series therewith, and independently rotated on their own axes by connections which impart to the picking fingers speedy rotation in one direction during the picking operation for the purpose of extracting the cotton from the bolls and wrapping the same around the fingers, and then reversal of such rotation so that during the reverse rotation the picked cotton may be removed from the fingers.

A cotton picker of this type has many important outstanding advantages over the various other known types, among which advantages particular mention may be made of its adaptability to pick cotton in a thorough efficient manner and in cleanly condition without injury to the cotton plants. Owing to its adaptability to pick cotton in a cleanly condition, the crop when picked will command a better price and in view of its ability to pick cotton without injury to the plants, it is obvious that unripe cotton will not be injured and may subsequently mature for removal.

A further advantage of the above type of cotton picking apparatus lies in its speed of action and the great amount of hard labor its use will avoid, although exhaustive tests have plainly indicated certain disadvantages in respect to its operation, many due to the picking fingers. It has for instance been necessary up to the present time at least to roughen the picking fingers in order to properly take the cotton out of the bolls and it is obvious that anything in the nature of a roughened surface, while of advantage during the picking of the cotton to cause the same to adhere to and wrap around the fingers, operates to the disadvantage of the apparatus later in that it makes the stripping of the cotton from the fingers correspondingly difficult.

Among the various objects of the present invention is the provision of means whereby picking fingers having smooth surfaces are rendered capable of peculiarly effective operation in the picking of the cotton while at the same time adapting the fingers to ready and easy stripping of the cotton therefrom subsequent to the picking operation. The invention also proposes many improvements and advantages over previous constructions, not only as to the picking fingers, but in a general way to the cylinder structure, finger reversing means, finger stripping mechanism, and other parts, all such improvements being the result of exhaustive tests and practical experiments in the actual construction and use of apparatus of this character.

As to the cylinder construction, the present invention proposes certain improvements whereby the cylinders may be formed in longitudinal sections held together by top and bottom plates in such manner as to permit of their ready disassembly in a manner substantially quicker and more effective than could be otherwise accomplished.

As to the finger stripping, the present invention proposes the use of cam actuated stripping bars, each operating in connection with a vertical line of picking fingers and having openings through which the fingers project so that upon outward movement of these bars along the fingers during the reverse rotation of the latter, the cotton previously picked and wrapped around the fingers, will be pushed from the ends of the fingers at a certain point in the rotation of the cylinders where it is convenient to pick up the stripped cotton by suction connections and transfer the same to storage compartments on the machine.

As to the reversing of the direction of rotation of the fingers between the picking of the cotton and the stripping thereof from the fingers, the present invention proposes the use of means which will impart speedy rotation to the fingers when reversed and which will thus cooperate to material extent in promoting efficient stripping of the cotton from the fingers.

The picking fingers themselves, according to the present invention are employed with smooth surfaces and, subsequent to each stripping operation and the next succeeding picking operation, each finger is supplied with moisture which has been and is even more effective for properly picking cotton than a roughened surface and is many times more effective than a roughened surface when it comes to taking the cotton off of the finger or stripping the same. In explanation of this it should be pointed out that the main consideration in so far as the actual picking of the cotton from the bolls is concerned is that the picking finger will be in such position that the least particle of cotton touching the same will be instantly wrapped around the finger so that the speedy rotation of the finger will have the effect of snapping the cotton completely out of the boll. I have found that while a smooth dry finger will not do this, the same finger supplied with moisture as for instance a surface film of oil instantly becomes as highly effective and efficient for this purpose as could be wished.

Having thus described in a general way the objects and advantages of the present invention, the detail description of the various parts will now be proceeded with having reference to the accompanying drawings which form a part of this specification and wherein,

Figure 7 is a perspective view of one of the wall sections of the cylinders,

Figure 8 is a detail perspective view showing the oil pump and oil distributing means, Figure 9 is a section through a portion of the wall of one of the cylinders and through the bearing portion of one of the picking fingers, Figure 10 is a perspective view of one of the fingers and its holder removed and in detached relation, Figure 11 is a perspective view showing certain of the finger stripping bars and their guides, Figure 12 is a detail perspective view of one of the stripping bars on an enlarged scale, Figure 13 is a sectional perspective view of one of the shield sections with its suction channel, Figure 14 is a vertical section through a portion of the finger moistening device, and Figure 15 is a sectional perspective view showing a portion of one of the finger moistening tubes.

Figure 1:
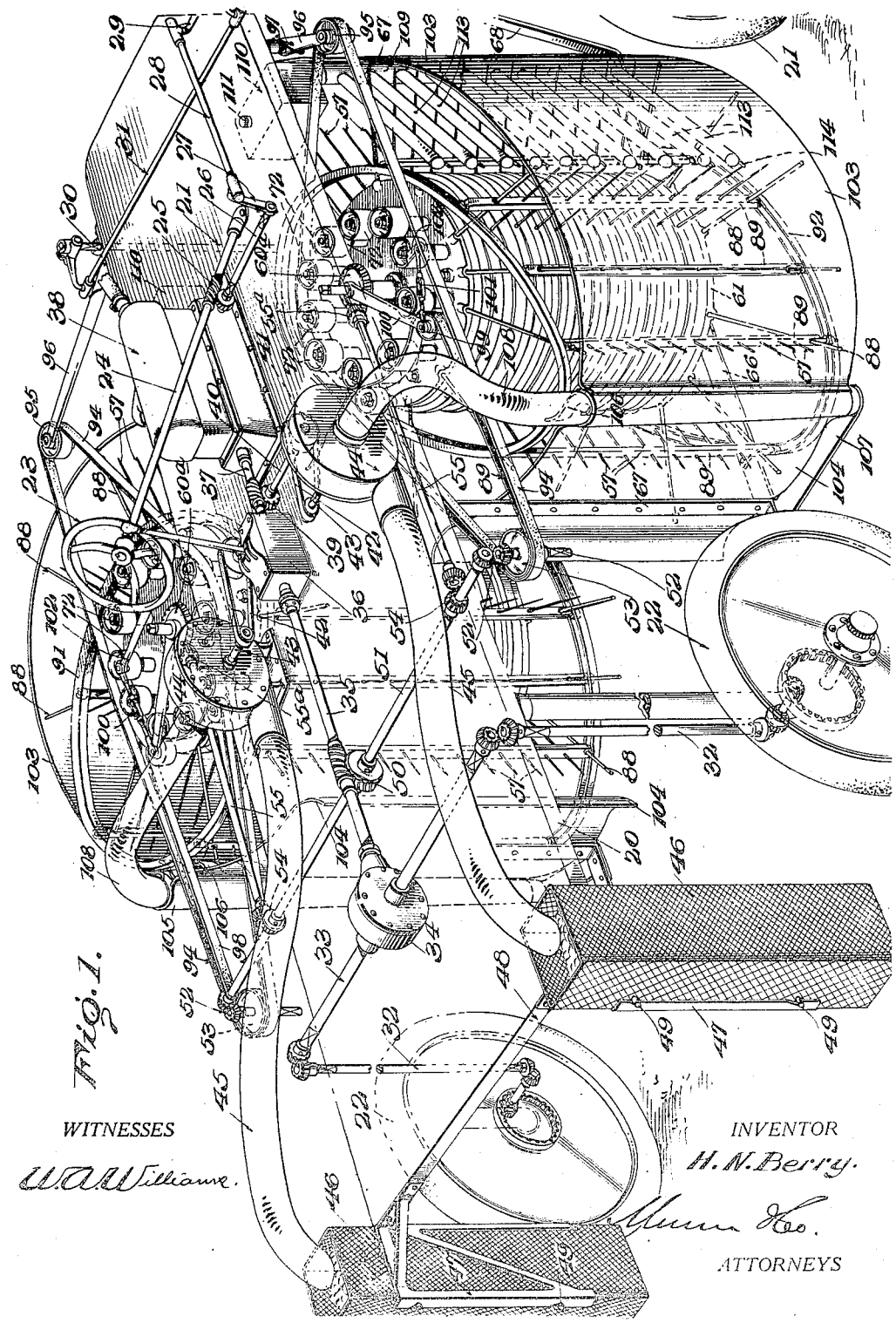
Figure 1 is a perspective view, more or less diagrammatic, of the general machine.
Figure 2:
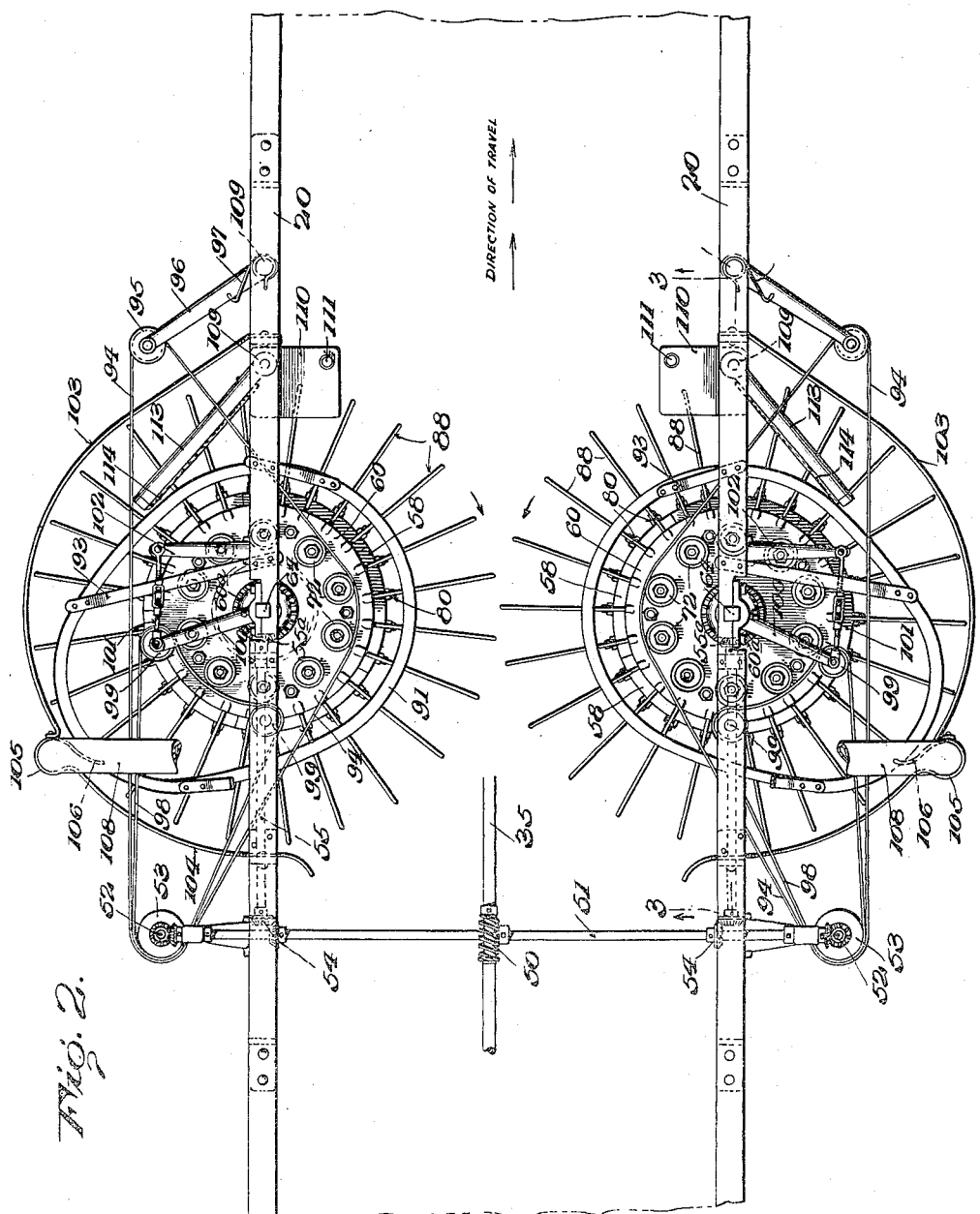
Figure 2 is a partial top plan view thereof.
Figure 3:
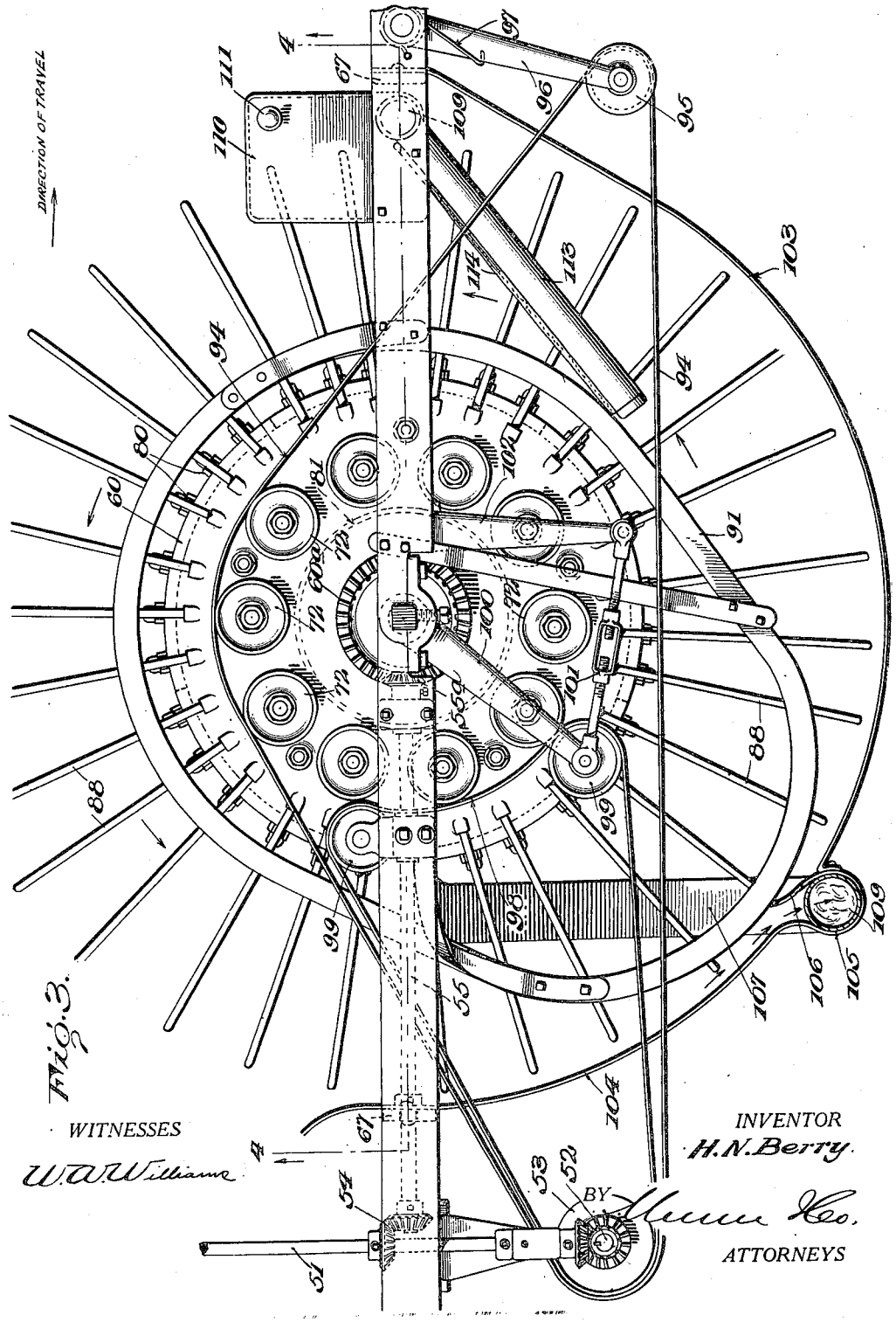
Figure 3 is an enlarged top plan view of one of the cylinders and the adjacent parts.
Figure 4:
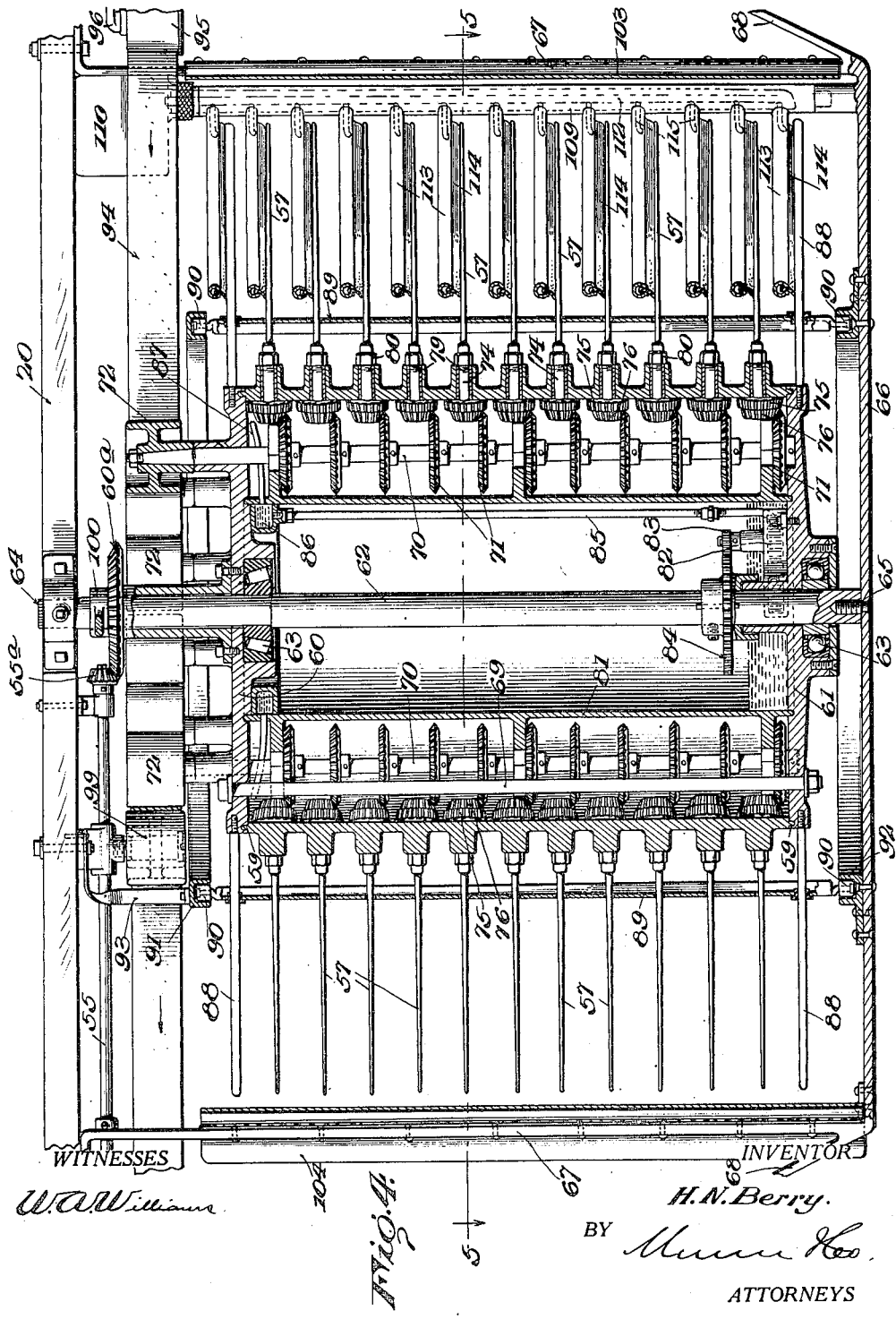
Figure 4 is a vertical longitudinal section taken substantially on line 4—4 of Figure 3.

Referring now to these figures and particularly to Figure 1 there are shown certain portions of a machine whose frame may include upper spaced parallel frame bars 20 as seen in Figures 2, 3 and 4 and omitted from Figure 1 in order to avoid obscuring the securing parts. The frame, however constructed, must be elevated in order to permit of straddling a row of cotton plants, the machine tracking upon forward and rear wheels 21 and 22 of which the former are steered from a steering wheel 23 and a steering post 24. This post has a worm and worm wheel connection at 25 with a rock shaft 26 whose crank 27 is flexibly connected to the rear end of a steering arm 28, the forward end of which is flexibly connected to the crank arm 29 of one of the upright wheel supporting shafts 30. These shafts are in connection at their upper ends by means of a tie rod 31 and their lower ends suitably support the spindles of the front wheels 21.

The rear wheels 22 are geared to the lower ends of upright shafts 32 and these upright shafts are geared at their upper ends to the outer ends of a rear upper cross shaft 33 having at its center a differential 34 connecting the same with the rear end of a propeller shaft 35. This propeller shaft proceeds rearwardly from the transmission 36 to which a drive shaft 37 extends rearwardly from the motor 38. Drive shaft 37 has a worm and worm wheel connection at 39 with an intermediate upper cross shaft 40 whose ends support pulleys 41 and driving belts 42 which actuate the shafts 43 of blowers 44, the latter discharging rearwardly through outlet pipes 45 which open into the tops of vertically disposed mesh cotton storage receptacles 46.

The storage receptacles 46 are detachably supported within receptacle holding brackets 47 mounted upon the ends of a rear cross frame 48 which in practice is secured to the rear portion of the main frame of the machine, brackets 47 having inclined notches or recesses which receive pins 49 outstanding from the cotton receptacles 46 so that the latter may be thus easily and quickly inserted in and removed from effective position.

The propeller shaft 35 has a worm and worm wheel connection at 50 intermediate its ends with a cross shaft 51 and this shaft is geared at its ends with the vertical shaft 52 of side drive pulleys 53 and is also geared adjacent to said ends as at 54 with the rear ends of longitudinal side shafts 55. The shafts 55 are geared at their forward ends to the upper ends of the cylinders in a manner to be presently described.

Figure 6:
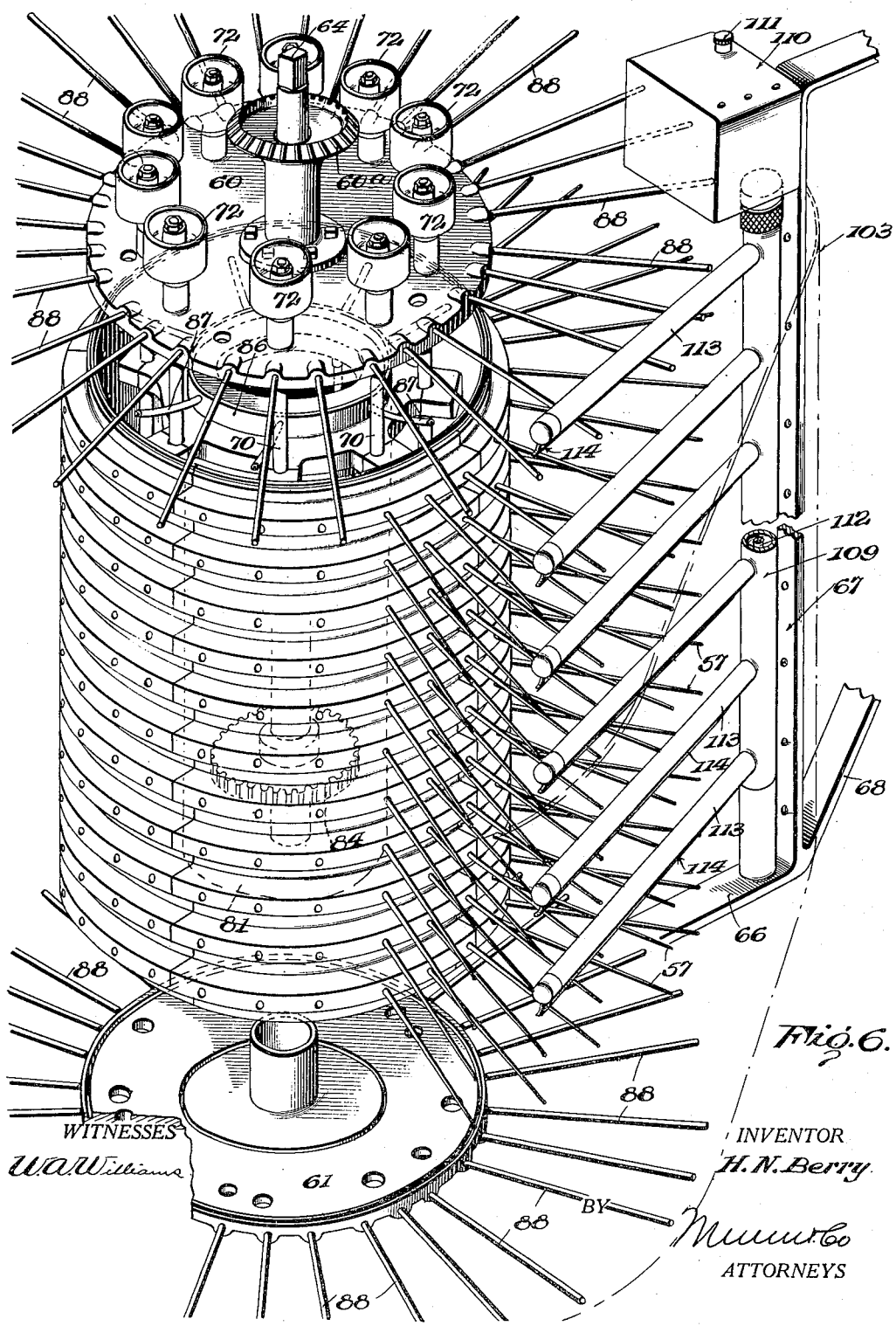
Figure 6 is a perspective view of one of the cylinders showing its parts in semi-detached relation and certain adjacent parts including the finger moistening arrangement.

The two cylinders, mounted opposite one another as shown in Figure 2 and laterally spaced to receive between them a row of cotton plants, are provided with radially outstanding picking fingers 57, the cylinders being alike so that a description of the cylinder shown in detail in Figures 3 and 7 inclusive will suffice for both. Each cylinder is made up of a series of vertical sections 58 one of which is shown in Figure 7, having ribs 59 along their upper and lower edges to cooperate with the annularly grooved top and bottom plates 60 and 61 most plainly seen in Figures 3 and 6, said top and bottom plates having central openings around an upright cylinder supporting post 62 and having antifriction bearings 63 which engage the post. The post 62 of each cylinder has a squared upper end 64 secured in the respective upper frame bar 20, the lower end of the post being fixed at 65 in the lower bar 66 of a cylinder supporting frame having upright end portions 67 and also inclined end portions 68 both the upright and inclined end portions being secured at their upper ends to the frame side bars 20.

Thus the several curved cylinder sections 58 when together form the wall of the cylinder between the top and bottom plates 60 and 61, the rib and groove engagement between these parts providing for a fluid tight enclosure which is completed by virtue of vertical tie bolts 69 between and through the top and bottom plates, the top and bottom plates having bearings for an annular series of vertical shafts 70 provided at spaced points within the cylinder with bevel gears 71. At the upper ends of the shaft 70 above the top plate 60 are secured pulleys 72 and these pulleys form parts of the driving connections of the picking fingers in a manner which will be presently described.

The cylinder sections 58 have bosses 73 in vertical lines outstanding therefrom forming bearings for the sleeve portions 74 of the holders of the picking fingers, each sleeve portion 74 having at its inner end within the cylinder a spur gear 75, it being noted from Figure 7 in particular that the arrangement is such that the gears 75 intermesh in series of three within and around the cylinder, the central gear 75 of each series also having a bevel gear 76 which meshes with one of the bevel gears 71 of one of the vertical shafts 70 thus making it necessary to have but one vertical shaft 70 for every three vertical lines of picking fingers. The sleeve portion 74 of each of the picking finger holders has its outer portion axially bored to receive the inner larger end of its respective picking finger 57 and is also provided with diametrically opposed slots 77 which receive diametrically outstanding lugs 78 of the picking finger. Moreover each holder sleeve has its outer end externally threaded as at 79 to receive a counterbored cap nut 80 which surrounds the inner portion of the picking finger and serves to hold the lugs 78 within slots 77. It is to be particularly noted at this point that each of the picking fingers gradually tapers to its outer smaller end and that its surface is entirely smooth from and beyond the lugs 78.

Each cylinder has an inner cylindrical wall 81 whose upper and lower ends cooperate with the top and bottom plates 60 and 61 to form an inner oil chamber in the base of which a pump 82 is located, the shaft of this pump having a small gear 83 in mesh with a larger gear 84 secured upon the lower portion of the cylinder supporting post 62 whereby the pump will be actuated as the cylinder revolves. The pump discharges through an upright pipe 85 into an upper hollow distributing ring 86, this ring having a series of radially outstanding distributing tubes 87 whose outer ends terminate above the several lines of gears 71 adjacent to the upper ends of the upright shaft 70 whereby the oil dripping from the distributing tubes 87 will be distributed by the gears 71 to the gears 75 and 76 of the finger holders.

Figure 5:
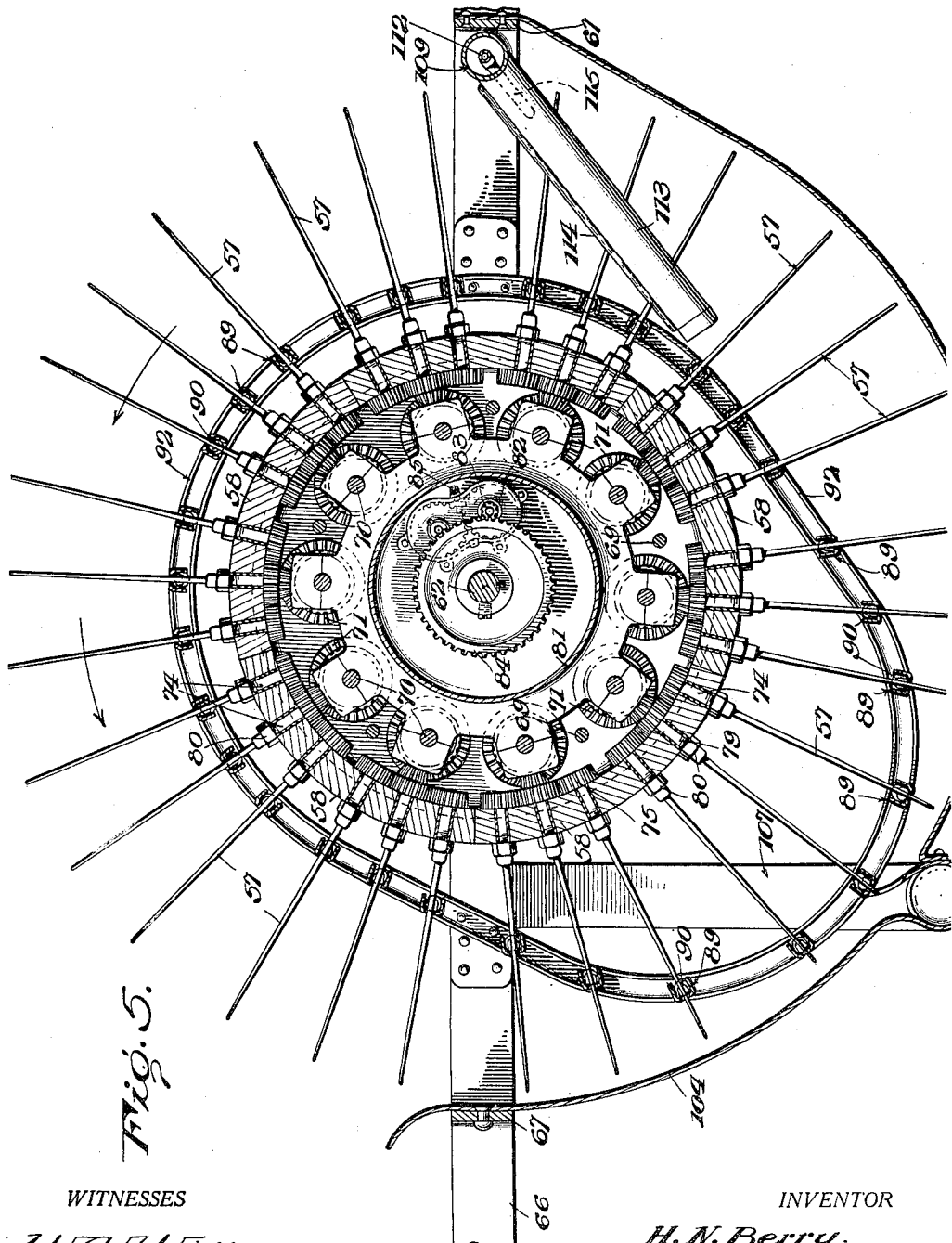
Figure 5 is a horizontal section taken substantially on line 5—5 of Figure 4.

The top and bottom plates 60 and 61 are also provided with radially outstanding guide fingers 88 in line with the vertical series of picking fingers 57, each line of picking fingers 57 of the corresponding guide fingers 88 receiving slidably thereon a vertical apertured stripping bar 89 having at its upper and lower ends guide rollers 90 movably disposed in upper and lower cam tracks 91 and 92. The upper cam track is secured in place by attaching arms 93 and disposed around the upper portion of the cylinder below the several shaft pulleys 72 while the lower cam track 92 is securely fastened to the lower bar 66 of the cylinder supporting frame before mentioned, the cam tracks being so shaped as best seen in Figures 3 and 5, as to hold the several stripping bars at their inner positions adjacent to the inner ends of the picking fingers around the inner portion of the periphery of the cylinder and gradually shift the bars outwardly to the outer ends of the picking fingers at a certain point along the outer periphery of the cylinder.

The pulleys 72 at the upper ends of the vertical shaft 70 are engaged along the inner periphery of each cylinder by a portion of a finger driving belt 94 passing at one point around a tension roller 95 secured at the end of a supporting arm 96 having an actuating spring 97 and a pivotal support upon one of the frame bars 20 and passing at another point around its drive pulley 53 previously described, it being thus obvious that in the course of rotation of the cylinders the pulleys 72 will successively come into engagement with a portion of the driving belt 94 at the inner periphery of the cylinder so that when engaged with the belt the shafts 70 will be rotated in one direction and this rotation will be communicated to the picking fingers through the gears 71, 75 and 76.

The forward ends of the side shafts 55 have gears 55ª engaging cylinder gears 60ª secured to the cylinder to top plates 60 and thus, it being understood that the cylinders are revolved at a speed to conform to the forward movement of the machine in operation, it is obvious that the picking fingers at the inner portions of the cylinders where they extend into the row of plants, will have little if any effect on the plants except by virtue of the speedy rotation of the picking fingers upon their own axes. As the pulleys 72 in the revolution of the cylinders move out of engagement with the driving belt 94, they are engaged by a portion of a reversing belt 98 extending between two guide rollers 99, one of which is mounted upon an adjustable arm 100 capable of adjustment through turnbuckle rods and connections 101 from a stationary arm 102, it being noted that the reversing belt 98 passes around the belt drive pulley 53 within the finger driving belt 94. It is thus obvious that when the pulleys 72 engage the reversing belt 98 the direction of rotation of the picking fingers 57 will be reversed and this takes place, it will be noted from Figure 3 in particular, at a time when due to the shape of the cam tracks 91 and 92 the respective stripping bars 89 are being shifted outwardly along the reversed stripping fingers so that the two features thus cooperate to thrust the cotton off of the stripping fingers, this action being greatly facilitated according to my present construction by virtue of the fact that the picking fingers have smooth surfaces. It is also obvious that by reversing the rotation of the picking fingers against a moving belt 98, considerable speed may be thus imparted to the fingers in their reverse rotation and it is also obvious that by arranging the reversing belt within the main driving belt 94 of the picking fingers, no additional driving connections are required.

Around the outer portion of the periphery of each of the picking cylinders, beyond the ends of the picking fingers 57 thereof, are shields each consisting of a forward section 103 and a rear section 104, the former secured at its forward end to the forward upright 67 of the cylinder supporting frame, and the latter secured at its rear end to the rear upright 67 of said frame. These shield sections are joined at their meeting ends and the forward portion of the rear section 104 is bent to provide an upright tubular cotton receiver 105 having inwardly projecting vertically spaced lips 106 as plainly seen in Figures 3 and 13 which project horizontally between the ends of the picking fingers, each tubular cotton receiver 105 being disposed opposite the point of farthest outward movement of the stripping bars 89 and being connected at its lower end to a laterally outstanding brace arm 107 and at its upper end to the respective suction tube 108 of the respective blower 44 which thus operates to pull the cotton as it is stripped from the picking fingers into the receiver 105 and through the suction tube 108, and also to discharge the cotton through the discharge pipe 45 into the storage holder 46.

As regards the picking fingers themselves and in explanation of the manner in which it is enabled to accomplish the desired picking operation with a smooth picking finger, it has been discovered that if moistened with oil, grease and probably various other fluids of a like or more tacky nature, the cotton may be picked equally as effective as if the surfaces of the picking fingers were burred or otherwise roughened and it has also been found that unlike the burred or roughened surface which prevents easy stripping of the cotton from the fingers, the application of oil, grease or a similar fluid to a smooth surface, permits of easily stripping the cotton from the fingers without detracting in any way from the appearance or the condition of the cotton, providing of course the moisture is properly applied without an oversupply. Therefore during the operation of the machine moisture is continuously supplied to the picking fingers during each revolution of the cylinder so that the picking fingers will in each operation thereof have a fresh supply of moisture for the effective accomplishment of their desired functions.

For the above purpose a moistening device is preferably employed in connection with each cylinder, including an upright tube 109 fixed in the forward portion of the cylinder supporting frame adjacent to the forward upright 67. This tube supports a supply tank 110 at its upper end, having a filling aperture normally closed by a cap 111 and from which a supply pipe 112 shown in part in Figure 14 depends through the tube 109. The tube 109 has a plurality of tubular horizontally outstanding moisture applying arms 113, each slotted along the lower portion thereof for the reception of a flexible wiper 114 of absorbent material. These applying arms 113 extend tangentially with respect to the cylinder between the horizontal rows of picking fingers 57 so that each wiper 114 depends into engagement with and receives thereagainst considerable portions of the picking fingers of the horizontal series next below the same. Each applying arm is supplied with the moisture from the moisture supply pipe 112 by virtue of short distributing pipes 115 extending horizontally from pipe 112 and into arms 113 and terminating at their free ends immediately above the adjacent portions of the wipers 114.

Thus in the operation of the machine it is driven forwardly in use by the same means transmitting rotation to the picking cylinders so that the forward movement of the machine and the revolution of the picking cylinders is thus synchronized and proportioned whereby injury to the cotton plants by virtue of the movement of the multitude of the picking fingers into and through the plants, is avoided. Along the inner portions of the peripheries of the picking cylinders and during the time in which the picking fingers are moving into and through the plants, these picking fingers, with their smooth surfaces previously supplied with moisture, are rapidly rotated on their own axes by virtue of the engagement of their driving shaft pulleys 72 with the effective portion of the main driving belt 94 and here again the smooth surfaces of the fingers are of great advantage in avoiding possible injury to the cotton plants which might result from the engagement of burred or otherwise roughened fingers with the leaves or stems of the plants or more especially with unopened or immature bolls.

Wherever these rapidly rotating moistened picking fingers come into contact with mature cotton, the cotton is instantly whisked around the fingers and completely out of the boll, any foreign matter being at the same time thrown off by centrifugal force. When thus wrapped around the picking fingers the cotton is carried with the latter until the fingers are reversed by virtue of the engagement of their shaft pulleys 72 with the reversing belt 98 where the rapid reverse rotation of the fingers has a tendency to slightly loosen the cotton previously wrapped thereon in order that the outward movement of the stripping bars will find the cotton in such a condition that it may be readily pushed from the outer ends of the picking fingers into the influence of the suction within the cotton receivers and by virtue of the continuous action of the blowers drawn from the receivers and forced into the cotton receptacles at the rear side portions of the machine.

As the machine progresses in the field and these cotton receptacles become filled, they may be removed and others quickly substituted without danger of the cotton becoming dirty or otherwise contaminated.

It is for the foregoing reasons that this improved machine has been found to be highly effective and efficient for the intended purposes, is of a simple inexpensive nature when its results are taken into consideration, is mechanically strong and durable with reasonable care, and may be operated with minimum labor and without especial skill in its manipulation. It is also for the foregoing reasons that this machine will result in the picking of cotton in a clean condition and in a thorough manner, enabling the cotton grower to harvest the complete crop in minimum time and with minimum labor and to subsequently obtain the maximum price to which he is entitled for the cotton so picked.

Having now particularly described and ascertained the nature of the invention and in what manner the same is to be performed, what I claim is:

1. In a cotton picker, vertically disposed revoluble picker cylinders, driving means therefor, rotatable picker fingers supported by and radiating from said cylinders, an annular series of vertical shafts rotatable in the cylinders and geared to the said picker fingers, said shafts having pulleys at their upper ends, means for rotating the picker fingers including a belt with which the pulleys of said shafts successively engage, during revolution of the cylinders, and means also including a belt with which the pulleys of the shafts are successively engageable for reversing the rotation of the picker fingers.

2. In a cotton picker, vertically disposed revoluble picker cylinders, driving means therefor, rotatable picker fingers supported by and radiating from said cylinders, an annular series of vertical shafts rotatable in the cylinders and geared to the said picker fingers, said shafts having pulleys at their upper ends, means for rotating the picker fingers including a belt with which the pulleys of said shafts successively engage during revolution of the cylinders and means also including a belt with which the pulleys of the shafts are successively engageable for reversing the rotation of the picker fingers, said belts being mounted one within the other and having a common driving source.

3. In a cotton picker, vertically disposed revoluble picker cylinders, driving means therefor, rotatable picker fingers supported by and radiating from said cylinders, an annular series of vertical shafts within each of the cylinders, geared to the said picker fingers and having their upper ends provided with pulleys and connections for rotating the picker fingers including belts mounted one within the other and successively engageable by said shaft pulleys to rotate the shafts in successively opposite directions.

4. In a cotton picker, vertically disposed revoluble picker cylinders, driving means therefor, rotatable picker fingers supported by and radiating from said cylinders, an annular series of vertical shafts within each of the cylinders, geared to the said picker fingers and having upstanding upper ends provided with pulleys and connections for rotating the picker fingers including belts mounted one within the other and successively engageable by said shaft pulleys to rotate the shafts in successively opposite directions, said belts having tension connections and a common driving source.

5. In a cotton picker, vertically disposed revoluble picker cylinders, picker fingers rotatably supported by the cylinders and radiating therefrom in vertical lines, driving means for said cylinders and said fingers, cam guides stationarily secured above and below each of said cylinders, and stripping bars movably supported by the said guides for revoluble movement with the cylinders, each of said bars having apertures receiving the picker fingers of a vertical series thereof and being slidable on these fingers toward and away from the cylinder by the said cam guides during revolution of the cylinders.

6. In a cotton picker, vertically disposed revoluble picker cylinders, picker fingers rotatably supported by the cylinders and radiating therefrom in vertical lines, driving means for said cylinders and said fingers, cam guides stationarily secured above and below each of said cylinders, and stripping bars movably supported by the said guides for revoluble movement with the cylinders, each of said bars having apertures receiving the picker fingers of a vertical series thereof and being shiftable on these fingers toward and away from the cylinder by the said cam guides during revolution of the cylinders, each of said cam guides being in the form of a grooved track, and each of said stripping bars having rollers at its upper and lower ends freely movable in the said tracks.

7. In a cotton picker, vertically disposed revoluble picker cylinders, picker fingers rotatably supported by the cylinders and radiating therefrom in vertical lines, driving means for said cylinders and fingers, cam guide stationarily secured above and below each of said cylinders, and stripping bars movably supported by the said guides for revoluble movement with the cylinders, each of said bars having apertures receiving the picker fingers of a vertical series thereof and being shiftable on these fingers toward and away from the cylinders by the said cam guides during revolution of the cylinders, each of said cylinders having top and bottom plates provided with relatively stationary radially outstanding guide fingers in line with the vertical series of picker fingers and also extending through the said stripping bars whereby to guide the latter and relieve lateral strain upon the picker fingers.

8. In a cotton picker, vertically disposed revoluble picker cylinders, picker fingers rotatably supported by and radiating from the said cylinders and disposed in vertical lines, means for driving said cylinders and fingers, a stripping bar for each of the vertical lines of picker fingers, having apertures through which the picker fingers extend, and means whereby to shift the said stripping bars lengthwise of the picker fingers and toward and away from the cylinders during rotation of the latter, and means carried by the picker cylinder for guiding the said stripping bars and avoiding lateral pressure thereof against the picker fingers.

9. In a cotton picker, vertically disposed revoluble picker cylinders, picker fingers rotatably supported by and radiating from the said cylinders and disposed in vertical lines, means for driving said cylinders and fingers, a stripping bar for each of the vertical lines of picker fingers, having apertures through which the picker fingers extend, and means whereby to shift the said stripping bars lengthwise of the picker fingers and toward and away from the cylinders during rotation of the latter, and means carried by the picker cylinders for guiding the said stripping bars and avoiding lateral pressure thereof against the picker fingers, said last named means consisting of rigid guide fingers radiating from the upper and lower portions of the cylinders in line with the picker fingers and upon which the upper and lower portions of the said stripping bars are movably disposed.

10. In a cotton picker including vertically disposed revoluble picking cylinders in laterally spaced relation, an annular series of vertical shafts rotatable in and projecting above each of said cylinders, picking fingers radiating from the cylinders and rotatably arranged in series of vertical rows for each of said vertical shafts, gearing connecting each vertical shaft and its series of rows of picking fingers, means for revolving the cylinders, and means for rotating the picking fingers including pulleys on the upper ends of said shafts and belts having portions movable at the near sides of the cylinders and into and out of engagement with which the said pulleys are movable during revolution of the cylinders.

11. In a cotton picker including vertically disposed revoluble picking cylinders in laterally spaced relation, an annular series of vertical shafts rotatable in and projecting above each of said cylinders, picking fingers radiating from the cylinders and rotatably arranged in series of vertical rows for each of said vertical shafts, gearing connecting each vertical shaft and its series of rows of picking fingers, means for revolving the cylinders, and means for rotating the picking fingers including pulleys on the upper ends of said shafts, guide pulleys arranged forwardly and rearwardly of the cylinders, and belts having portions movable around said guide pulleys and between the same at the near sides of the cylinders and into and out of engagement with which portions of the belts the said pulleys are movable during revolution of the cylinders.

HIRAM NEWTON BERRY.